(12) United States Patent
Shi et al.

(10) Patent No.: US 9,518,606 B2
(45) Date of Patent: Dec. 13, 2016

(54) BEARING APPARATUS WITH SURFACE MIGRATION CHANNELS

(71) Applicant: Seagate Technology LLC, Cupertino, CA (US)

(72) Inventors: Zheng Shi, Shakopee, MN (US); Jeffrey Robert Lind, Robbinsdale, MN (US); Glenn A. Benson, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/641,876

(22) Filed: Mar. 9, 2015

(65) Prior Publication Data
US 2016/0265593 A1 Sep. 15, 2016

(51) Int. Cl.
*G11B 5/48* (2006.01)
*F16C 33/66* (2006.01)
*F16C 19/26* (2006.01)

(52) U.S. Cl.
CPC ........... *F16C 33/6681* (2013.01); *F16C 19/26* (2013.01); *G11B 5/48* (2013.01); *G11B 5/4813* (2013.01)

(58) Field of Classification Search
CPC ............. G11B 5/48; G11B 5/55; G11B 5/012; F16C 27/04
USPC ............................................. 360/265–265.8
See application file for complete search history.

(56) References Cited

U.S. PATENT DOCUMENTS

| | | | |
|---|---|---|---|
| 1,794,772 A | 3/1931 | Hughes | |
| 3,743,369 A | 7/1973 | Langstrom | |
| 5,575,569 A | 11/1996 | Shinohara | |
| 6,332,717 B1 | 12/2001 | Oohira et al. | |
| 6,402,386 B1 | 6/2002 | Daikuhara | |
| 7,114,852 B2 | 10/2006 | Compassi | |
| 7,178,986 B2 * | 2/2007 | Ohtsuki | F16C 33/6696 384/470 |
| 8,523,449 B2 * | 9/2013 | Hamada | F16C 33/3856 384/470 |
| 2002/0041719 A1 * | 4/2002 | Kawakami | F16C 33/414 384/470 |
| 2004/0141672 A1 * | 7/2004 | Naito | F16C 33/416 384/531 |
| 2006/0193545 A1 * | 8/2006 | Bridges | F16C 33/3843 384/470 |
| 2009/0220181 A1 * | 9/2009 | Yamada | F16C 33/3812 384/513 |

(Continued)

FOREIGN PATENT DOCUMENTS

JP 2013044346 A * 3/2013

*Primary Examiner* — Allen T Cao
(74) *Attorney, Agent, or Firm* — Crawford Maunu PLLC

(57) ABSTRACT

Aspects of the present disclosure are directed to bearings, their manufacture and implementation. As may be implemented in accordance with one or more embodiments, an apparatus includes a bearing cage with a plurality of ball pockets at respective locations along a length of the bearing cage. Each ball pocket holds a ball. A plurality of lubricant reservoirs are respectively located between adjacent ones of the ball pockets along the length of the bearing cage. A plurality of lubricant migration channels are recessed in the bearing cage, extend between and connect one of the lubricant reservoirs and one of the ball pockets, and flow lubricant between the one of the lubricant reservoirs and the one of the ball pockets.

20 Claims, 9 Drawing Sheets

(56) References Cited

U.S. PATENT DOCUMENTS

| | | | |
|---|---|---|---|
| 2011/0065515 A1* | 3/2011 | Kozlowski | F16D 3/221 464/15 |
| 2012/0251027 A1 | 10/2012 | Pottebaum | |
| 2012/0308172 A1* | 12/2012 | Shaikh | F16C 19/182 384/523 |
| 2013/0051717 A1* | 2/2013 | Duffy | F16C 33/6681 384/470 |
| 2013/0266250 A1 | 10/2013 | Brown | |
| 2013/0330031 A1* | 12/2013 | Mineno | F16C 33/3875 384/470 |
| 2014/0064649 A1* | 3/2014 | Fukama | F16C 33/3875 384/484 |
| 2014/0369636 A1* | 12/2014 | Tagle | F16C 33/3887 384/470 |
| 2015/0233425 A1* | 8/2015 | Fukama | F16C 33/3875 384/530 |
| 2016/0108964 A1* | 4/2016 | Batalha | F16C 33/6629 384/470 |

\* cited by examiner

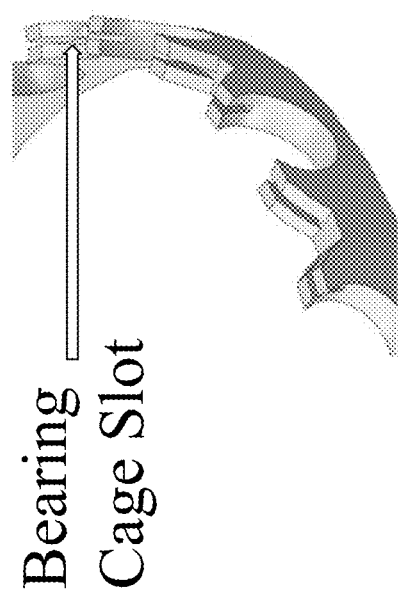
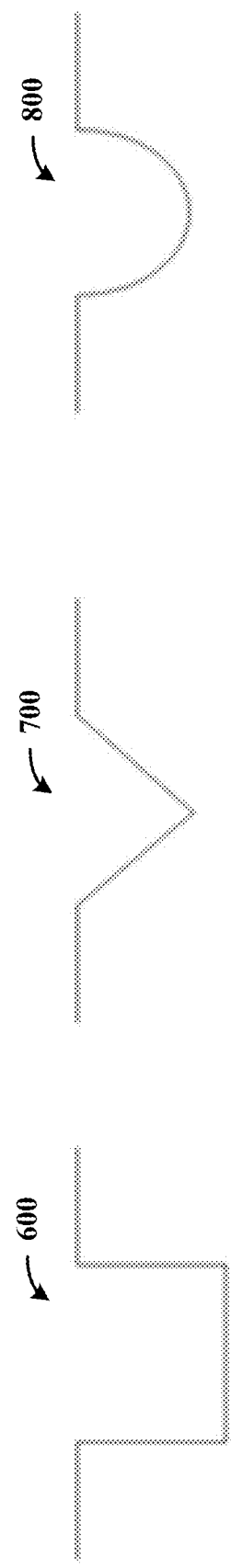
FIG. 6
FIG. 7
FIG. 8

BEARING APPARATUS WITH SURFACE MIGRATION CHANNELS

FIELD

Aspects of various embodiments are directed to bearings, and to bearing apparatuses with surface migration channels.

BACKGROUND

Providing lubricant to bearings can be important and challenging for many bearing applications. Bearing cages or bearing retainers represent such an application, in which balls or rollers are spaced along a cage or retainer structure and in which lubricant is contained in reservoirs between pockets for the balls or rollers, along the cage or retainer structure. A bearing apparatus may include inner and outer bearing races, balls, and such a cage/retainer that holds the balls or rollers.

An important function of some bearing cages or retainers is to store grease in areas between the pockets to provide lifetime lubrication. Oil bleeding from the grease migrates away from the reservoir and along the cage surfaces due to local capillary and surface forces. This oil in the pockets lubricates ball or roller surfaces through cage contact. Ensuring proper migration of this oil can be challenging. Inadequate migration may result in failures relating to bearing wear and grease degradation, due to insufficient lubricant supply in the race-ball (or roller) contact interfaces and frictional heating.

These and other matters have presented challenges to lubrication with bearing cages, for a variety of applications.

SUMMARY

Various example embodiments are directed to bearing cages and their implementation. According to an example embodiment, an apparatus includes a bearing cage having ball pockets at respective locations along a length of the bearing cage, with each ball pocket being configured to hold a ball. A plurality of lubricant reservoirs and lubricant migration channels are recessed in the bearing cage between adjacent ones of the ball pockets, along the length of the bearing cage. Each lubricant migration channel extends between and connects one of the lubricant reservoirs and one of the ball pockets, and flows lubricant between the lubricant reservoir and ball pockets.

Another embodiment is directed to a bearing cage apparatus having first, second and third portions that respectively hold a rolling component, hold lubricant and flow the lubricant between the first and second portions. Each first portion (e.g., a ball or roller pocket) is spaced apart from other ones of the first portions and hold a rolling component (e.g., a ball or roller). Each second portion (e.g., reservoir) is located between adjacent ones of the first portions, and holds or stores lubricant that is conveyed to the first portions via the third portion extending between and connecting one of the second portions with one of the first portions. Each third portion includes lubricant migration channels recessed in the third portion and operable to flow lubricant between the one of the second portions and a rolling component held by one of the first portions.

Another embodiment is directed to a hard disc drive apparatus having a disc that stores data, a head that reads and writes data from and to the disc, an actuator arm having a first portion connected to the head, and a pivot spindle that is connected to a second portion of the actuator arm and operates with the actuator arm to move the head relative to the disc for accessing data stored at different locations on the disc. The pivot spindle has a bearing component including a bearing cage with pockets at respective locations along a length of the bearing cage, with a rolling component in each of the pockets. The pivot spindle also has a bearing race with a groove that operates with the balls and the cage to provide rotation of the pivot spindle via rotation of the bearing cage and movement of the rolling components in the groove. Lubricant reservoirs are located between adjacent ones of the pockets along the length of the bearing cage, and lubricant migration channels are recessed in the bearing cage. Each lubricant migration channel extends between and connects one of the lubricant reservoirs and one of the pockets and flows lubricant between the one of the lubricant reservoirs and the one of the pockets.

In some implementations, the bearing cage has respective sidewalls extending along the length and defining a thickness of the bearing cage, with a portion of the sidewalls extending between each pocket and one of the lubricant reservoirs. Each pocket is defined by a portion of the bearing cage extending along the thickness, and each lubricant reservoir has an opening defined by a portion of the bearing cage between adjacent ones of the pockets and in which lubricant is contained. Each lubricant migration channel has sidewalls that are confined within the thickness of the bearing cage between the sidewalls thereof, and that have a surface area of at least twice a surface area of the portion of the sidewalls extending between each ball pocket and one of the lubricant reservoirs. The surfaces of each lubricant migration channel are operable to provide capillary action to flow lubricant from the lubricant reservoirs to the ball pockets via capillary action.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIG. 6 shows a channel shape, in accordance with one or more embodiments;

FIG. 7 shows a channel shape, in accordance with one or more embodiments;

FIG. 8 shows a channel shape, in accordance with one or more embodiments; and

Figure 1A:
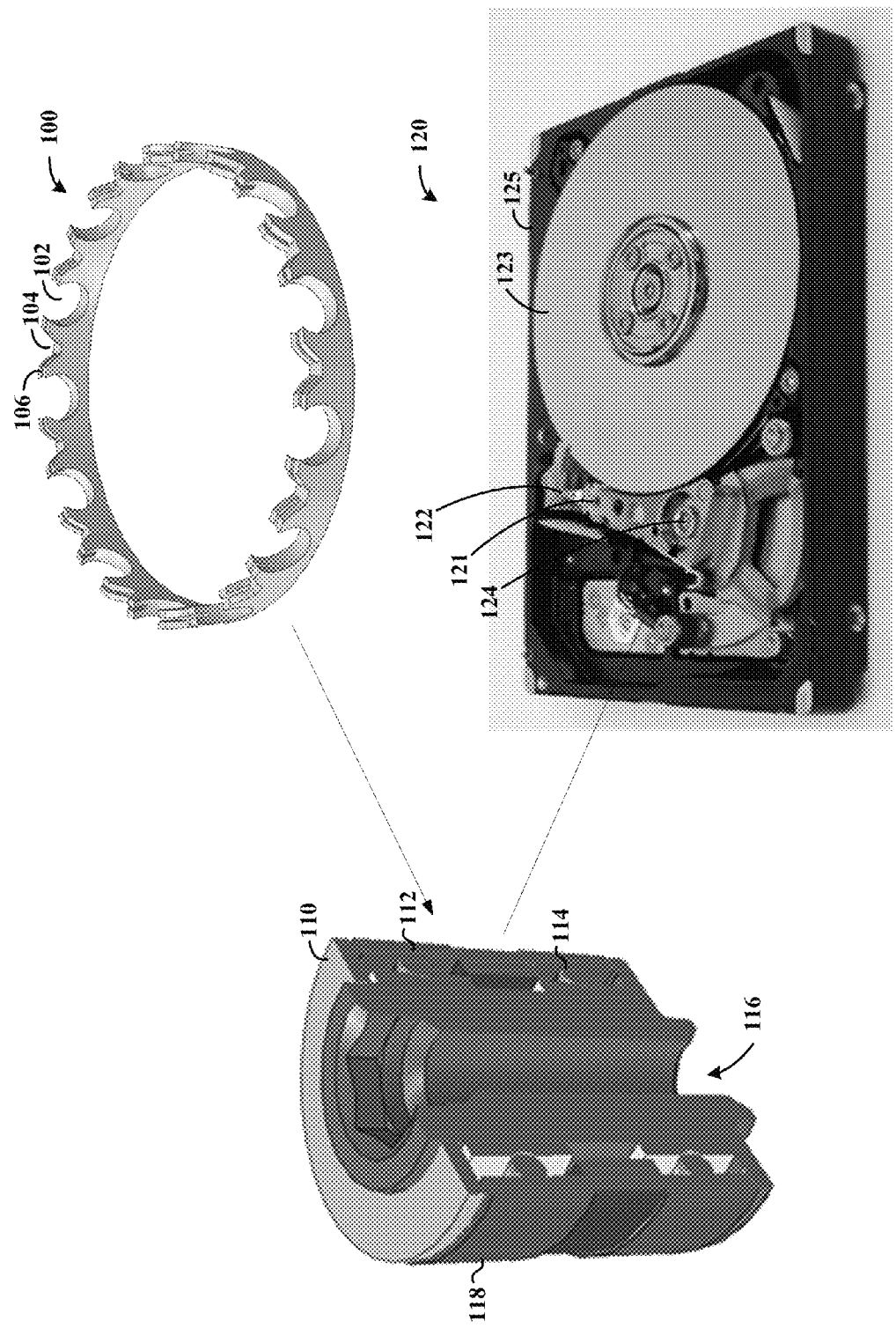
FIG. 1A shows a bearing cage apparatus and example assembly, as may be implemented in accordance with one or more example embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving bearings, and particularly to bearing applications with bearing cages or retainers that rely upon lubricant migration along the cages or retainers. In certain implementations, aspects of the present disclosure have been shown to be beneficial when used in the context of bearing cages for pivot bearings or other types of bearings in which lubricant is desirably prevented from leaking out of a bearing. Certain implementations employ relatively limited amounts of lubricant in order to reduce the likelihood of lubricant leakage, which may elevate the importance of effective delivery of this limited amount of lubricant to balls or rollers. While not necessarily so limited, various aspects may be appreciated through a discussion of examples using such exemplary contexts. Further, while various embodiments characterize applications with balls or rollers and related cages/retainers, such applications are employed with other types of bearings in a similar manner.

According to various example embodiments, aspects of the present disclosure are directed to a bearing apparatus that employs lubricant migration channels that provide enhanced flow of lubricant between reservoirs and pockets for lubricating roller components such as balls or rollers. The channels may, for example, enhance lubricant flow by providing additional surface area that acts to flow lubricant via capillary forces. One such embodiment involves a bearing cage having rolling component pockets that hold a rolling component such as a ball or roller, and that are spaced apart at respective locations along a length of the bearing cage. Lubricant reservoirs are placed adjacent (e.g., between) the pockets, and lubricant migration channels couple the lubricant reservoirs to one or more of the pockets for flowing lubricant thereto.

In various embodiments, a pivot spindle for a hard disc drive employs one or more bearing apparatuses as characterized herein. Each ball bearing includes inner and outer races, balls, and a cage/retainer, and is lubricated with grease. The grease may include base oil (e.g., as used for machine lubrication) and thickener that holds the base oil (e.g., like a sponge). The bearing cage stores the grease in reservoir areas between ball pockets, and the grease may provide lifetime lubrication (e.g., with sealed bearings). Oil bleeding from the grease migrates away from the reservoir and along surfaces of the cage due to local capillary and surface forces. The grease base oil in the ball pockets directly lubricates a ball surface through ball-cage contact. The cage/retainer includes one or more slots, channels, openings or grooves between the reservoir areas and the ball pockets as characterized herein, which operate to increase available surface area and enhance the local capillary and surface forces in a manner that facilitates flow of the oil to lubricate the ball surfaces. This increased surface area can also be implemented to delay an interference effect of degraded grease deposited on edges of cage ball pockets. With these approaches, adequate lubrication can be achieved with less grease, which can operate to mitigate leakage of the oil from the bearing assembly and/or spindle. This approach is particularly useful, for example, in applications in which leakage of the oil is detrimental to surrounding areas (e.g., within a hard disc drive), and further mitigates drive failure due to pivot bearing problems.

The size and shape of slots, channels, openings or grooves as characterized herein vary, depending upon the application and aspects such as the viscosity of grease base oil and bearing work temperature. In certain embodiments, a channel, slot or opening width is about ⅕ to ⅓ of a thickness of a cage/retainer that holds the balls (or rollers). In such embodiments or other embodiments, the channel depth is about the same depth of a grease reservoir between ball pockets, such as about ¼ to ⅓ of the height of the cage/retainer. As such, bearing cages or retainers may be implemented with one or more oil migration channels, holes or grooves, in various patterns. Exemplary such structures are shown in the figures and discussed further below, and can be combined or modified to work together, such as by using a combination of holes and grooves, slots and grooves, or others. Further, the orientation of holes and grooves can be changed relative to that shown, with dimensions and number of grooves, holes, and channels being set based on grease and base oil properties as well as bearing cage dimensions.

According to an example embodiment, a bearing cage has ball or roller pockets at respective locations along a length of the bearing cage, with each pocket holding (or being operable to hold) a rolling component. Lubricant reservoirs and migration channels are recessed in the bearing cage adjacent the pockets (e.g., between the pockets), along the length of the bearing cage, with the migration channels connecting one of the lubricant reservoirs and one of the pockets for flowing lubricant therebetween. In this and other contexts, implementations involving a ball type roller component as characterized herein can be implemented with other roller components, such as cylindrical rollers, oblong components and others that provide bearing-type interaction/rotation between structures.

In a more particular embodiment, the bearing cage has respective sidewalls extending along the length and defining a thickness of the bearing cage, and each ball pocket is defined by a portion of the bearing cage extending along the thickness. Each lubricant reservoir has an opening defined by a portion of the bearing cage between adjacent ones of the ball pockets, and contains lubricant in the opening. Each lubricant migration channel has sidewalls confined within the thickness of the bearing cage between the sidewalls thereof. In certain implementations, the sidewalls of the bearing cage are concentric and face one another in a direction along the thickness of the bearing cage. In various implementations, the channel provides an enhanced surface area that is at least twice a surface area of the portion of the sidewalls extending between each ball pocket and one of the lubricant reservoirs, and the surfaces of each lubricant migration channel flow lubricant via capillary action as also enhanced by the surface area.

In another embodiment, the bearing cage also has sidewalls that define the thickness of the bearing cage and that have a height that extends from an upper surface to a lower surface. Each lubricant migration channel includes a slot having sidewalls that extend from the upper surface toward the lower surface along the direction of the height, and that extend between one of the lubricant reservoirs and one of the ball pockets. In some implementations, the lubricant reservoirs extend from an opening at the upper surface to a bottom reservoir surface recessed below the upper surface and above the lower surface. Each slot extends from the upper surface to a bottom slot surface having a depth that is as deep as, or deeper than, a depth at which the bottom reservoir surface is recessed. In some implementations, the lubricant reservoirs extend from an opening at the upper surface to a bottom reservoir surface that is recessed below the upper surface to a level that is above the lower surface. Each slot extends from the upper surface to a bottom slot surface having a depth that is less than a depth at which the bottom reservoir surface is recessed.

In some embodiments, each of the lubricant migration channels includes an opening extending through and enclosed by a portion of the bearing cage, with each opening being recessed between an upper and lower surface (as noted above) and extending between one of the lubricant reservoirs and one of the ball pockets. In certain embodiments, each of the lubricant migration channels includes a groove extending between one of the lubricant reservoirs and one of the ball pockets in a portion of the bearing cage sidewall. For instance, the groove may extend along a surface of the bearing cage that defines the one of the lubricant reservoirs.

A variety of bearing shapes and sizes are implemented to suit particular embodiments. In some embodiments, a bearing cage as characterized herein is circular and has an inner surface and an outer surface that is concentric with the inner surface. The bearing cage is between inner and outer bearing races. The inner bearing race has a ball groove on an outer surface, and the outer bearing race that is concentric with the inner bearing race has a ball groove on an inner surface. The races affix the bearing cage and balls between the inner bearing race and the outer bearing race via the ball grooves.

Another embodiment is directed to a bearing cage apparatus having first, second and third portions that respectively hold a rolling component, hold lubricant and flow the lubricant between the first and second portions. Each first portion (e.g., a ball or roller pocket) is spaced apart from other ones of the first portions and hold a rolling component (e.g., a ball or roller). Each second portion (e.g., reservoir) is located between adjacent ones of the first portions, and holds or stores lubricant that is conveyed to the first portions via the third portion extending between and connecting one of the second portions with one of the first portions. Each third portion includes lubricant migration channels recessed in the third portion and operable to flow lubricant between the one of the second portions and a rolling component held by one of the first portions.

In various implementations, each first portion is defined by a portion of the bearing cage extending along a thickness of the bearing cage, with respective sidewalls extending along the length and defining the thickness. Each second portion has an opening that contains the lubricant and is defined by a part of the bearing cage between adjacent ones of the first portions. Each lubricant migration channel has sidewalls confined within the thickness of the bearing cage between the sidewalls.

The channels are implemented in a variety of manners, such as with a slot having sidewalls recessed from an upper surface, openings recessed from the upper surface, or grooves. In some instances, a channel has surfaces defined by the bearing cage and having a surface area that is at least twice a surface area of the portion of the sidewalls extending between each first portion and one of the second portions, which facilitates lubricant flow via capillary action.

Turning now to the figures, FIG. 1A shows a bearing cage apparatus 100 and example assembly, as may be implemented in accordance with one or more example embodiments. The bearing cage apparatus 100 includes pockets, lubricant reservoirs and channels that flow lubricant from the reservoirs to the pockets. Pocket 102, reservoir 104 and channel 106 are labeled as reference. The bearing cage apparatus 100 is shown by way of example as being implemented with a bearing 110 at respective locations 112 and 114. The bearing cage apparatus 100 rotates with an outer surface at 118 relative to bearing surface mounted on a shaft or other component fixed at an inner surface at opening 116. The bearing cage apparatus 100 may be implemented with a variety of types of bearings, as single cage or with two or more cages. Further, various other bearing cages as shown in the figures and described herein may be implemented in place of, or in addition to, the bearing cage apparatus 100 to suit particular embodiments.

By way of example, FIG. 1A shows the bearing cage apparatus 100 and bearing 110 implemented in a hard disk drive apparatus 120, as part of a spindle 121 that holds a read/write head 122. A recording medium (disk) 123 is located adjacent the spindle 121, in which the spindle operates to move the read/write head 122 relative to the recording medium. The bearing 110 provides rotation for the spindle about an axis at 124. The components are within a drive housing 125 (e.g., with a cover that seals the components within the housing).

Figure 1B:
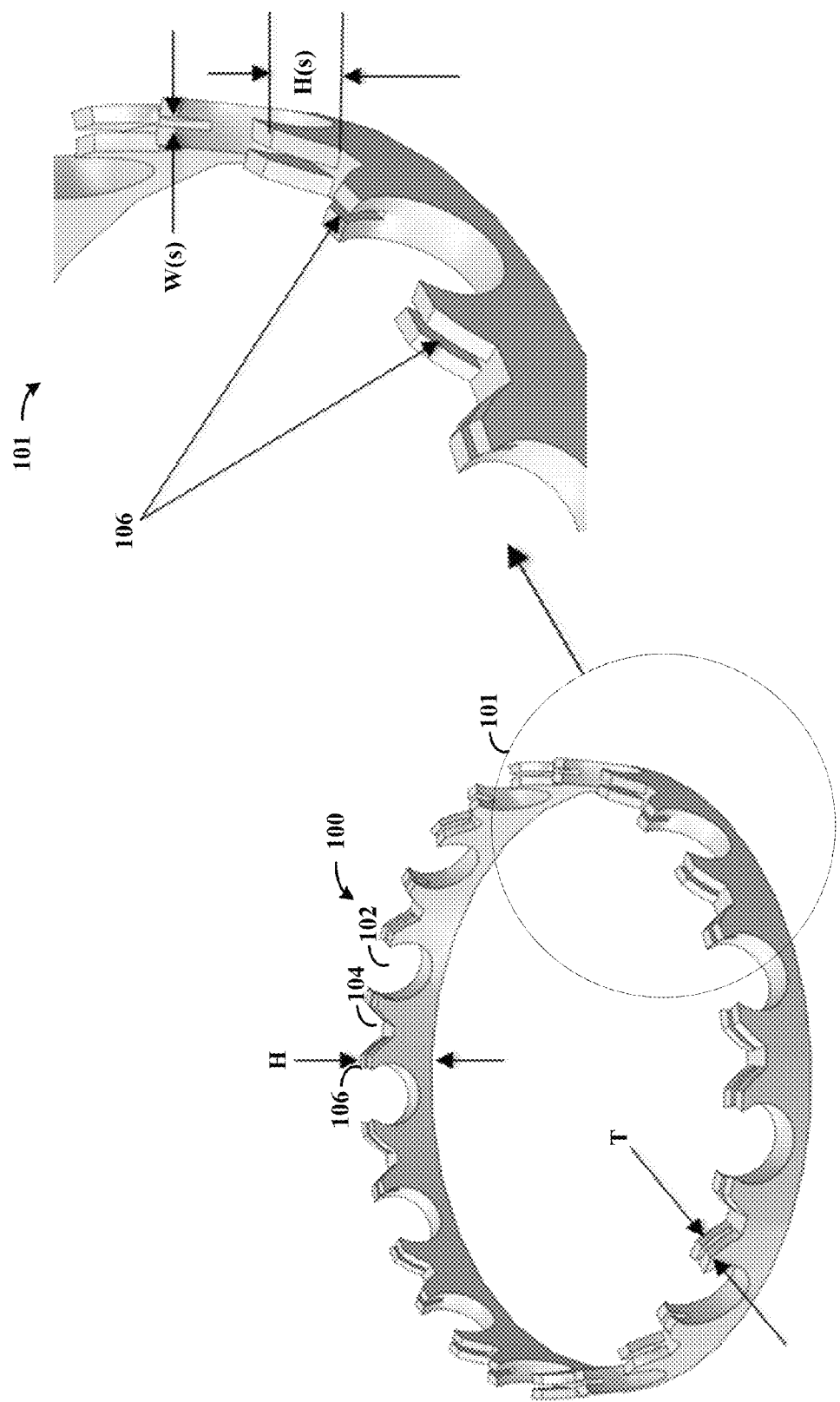
FIG. 1B shows a detailed view of the bearing cage apparatus shown in FIG. 1A, and an oil migration channel therein.

FIG. 1B shows a detailed view of the bearing cage apparatus 100 shown in FIG. 1A, in an alternate view with an inset portion 101 showing details of an oil migration channel. The apparatus 100 has an overall height H, from a lower surface to an upper surface, and a thickness T. Each slot (106) has a slot height H(s) and slot width W(s) as shown.

Figure 1C:
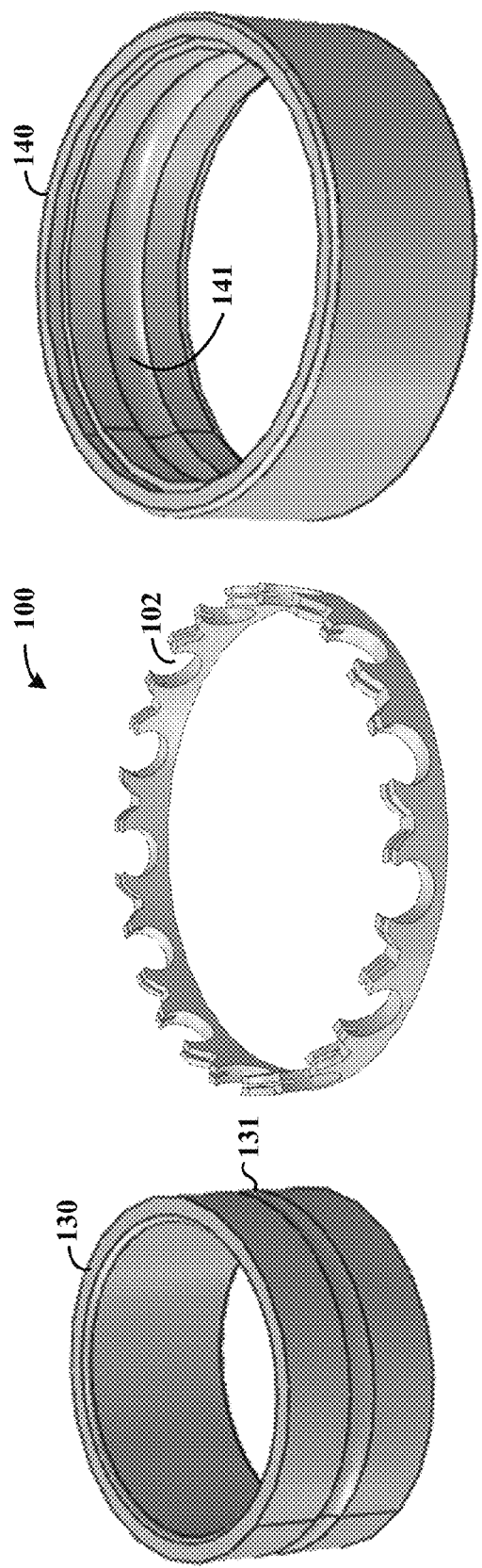
FIG. 1C shows the bearing cage apparatus of FIG. 1B with inner and outer races, in accordance with a particular embodiment.

FIG. 1C shows the bearing cage apparatus 100 of FIG. 1B, with inner race 130 and outer race 140, in accordance with a particular embodiment. The races have respective ball grooves 131 and 141, which operate with pockets (102 labeled by way of example) in the bearing cage apparatus 100 to hold balls and the cage apparatus in place. As such, for various embodiments the bearing cage apparatus 100 is assembled around the inner race 130 and within the outer race 140, with the pockets and ball grooves aligned.

FIGS. 2-5 show bearing cage apparatuses with different types of oil migration channels, in accordance with respective embodiments. The bearing cage apparatuses in these figures may, for example, be implemented with the bearing and/or disc drive shown in FIG. 1A. These apparatuses may also be implemented with inner and outer races as shown in FIG. 1C. Further, a combination of such bearing cages can be implemented within a common bearing.

Figure 2:
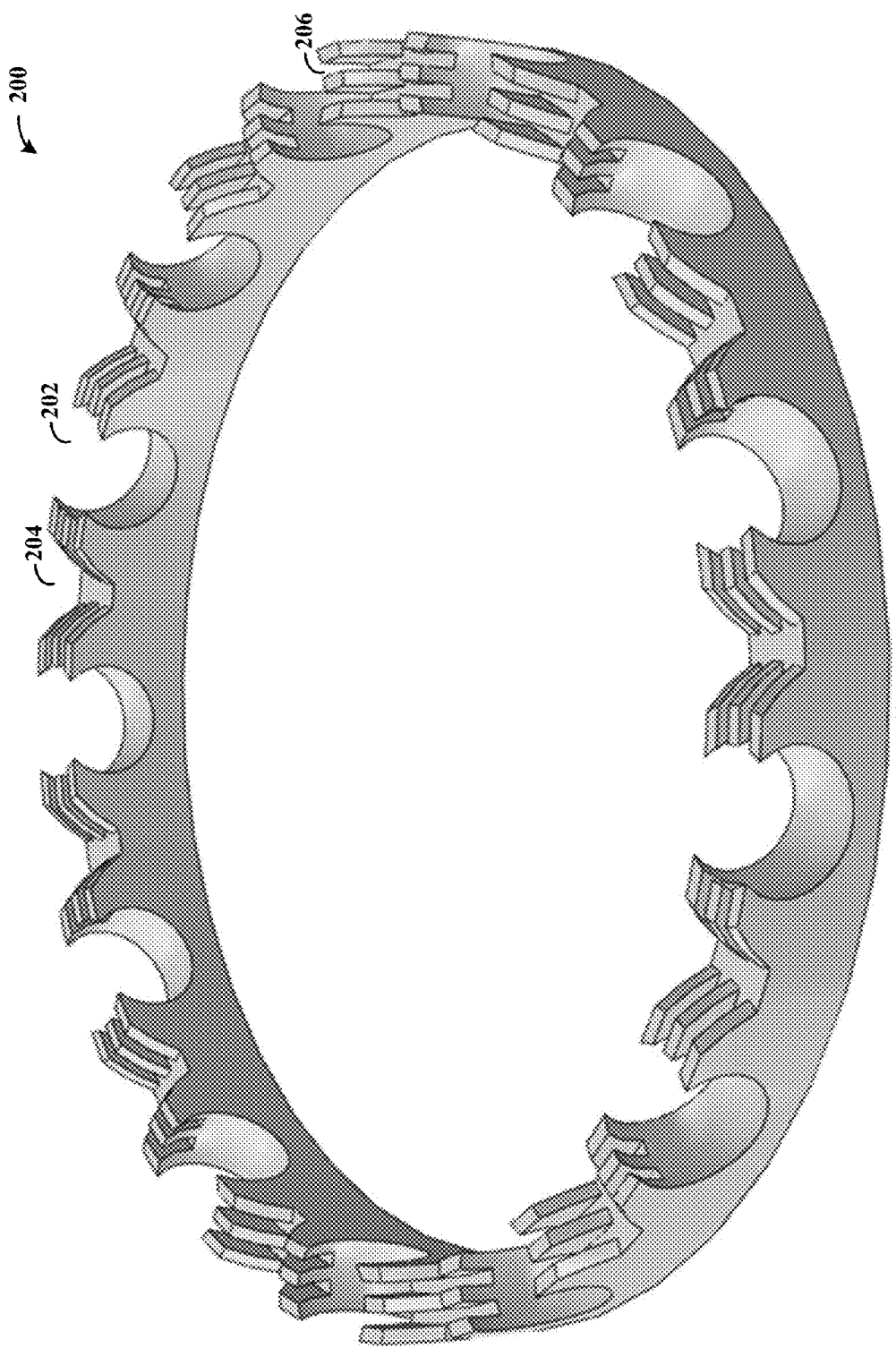
FIG. 2 shows a bearing cage apparatus with multiple oil migration channels, in accordance with another example embodiment.

Referring specifically to FIG. 2, the bearing cage apparatus 200 includes multiple pockets with reservoirs between the pockets, and two channels between each pocket and reservoir. By way of example, pocket 202, reservoir 204 and channel 206 are labeled. Two channels are shown connecting each reservoir to each pocket adjacent the reservoir. Other embodiments are directed to additional channels (e.g., 3 or more total) between some or all of the pockets and reservoirs.

Figure 3:
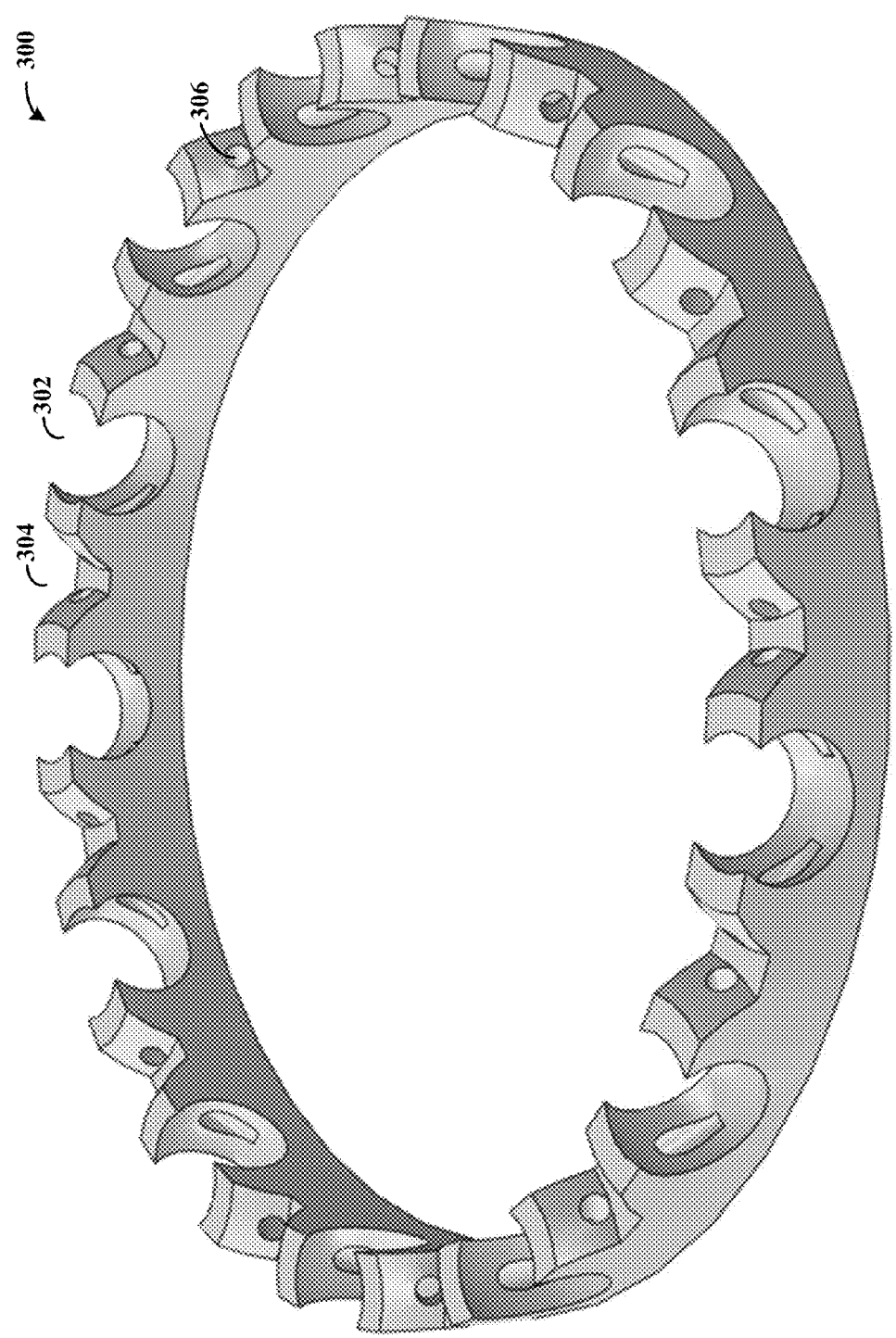
FIG. 3 shows a bearing cage apparatus with oil migration openings, in accordance with another example embodiment.

FIG. 3 shows bearing cage apparatus 300 with tunnel-like oil migration openings recessed within sidewalls of the bearing cage. The bearing cage apparatus 300 includes multiple pockets with reservoirs between the pockets, with the tunnel-type openings between each pocket and reservoir. By way of example, pocket 302, reservoir 304 and opening 306 are labeled. Two or more such tunnel-type openings may be implemented between a pocket and reservoir. In addition, various tunnel shapes may be employed, such as rectangular, square, oval and tunnels with variably-shaped perimeters/sidewalls.

Figure 4:
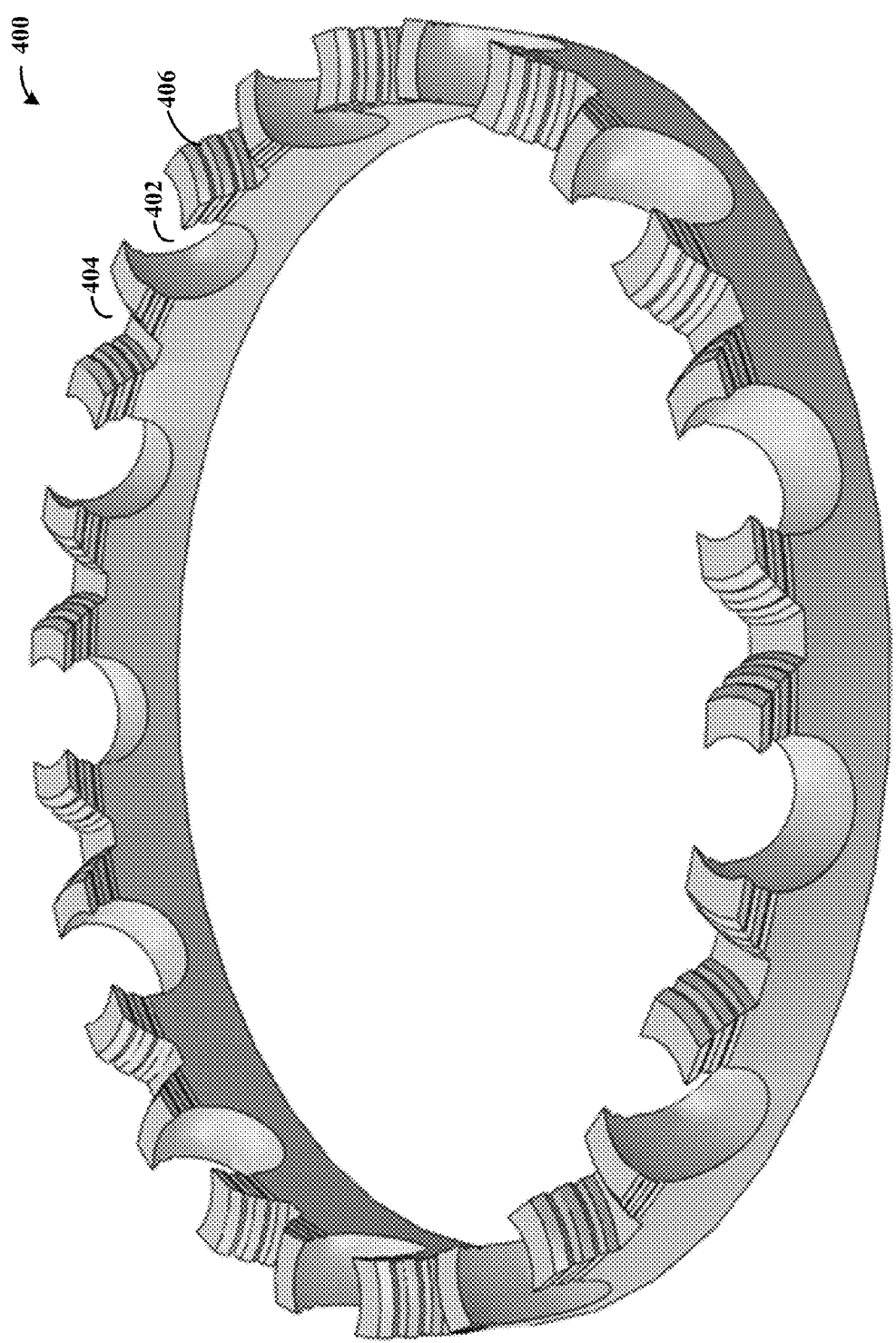
FIG. 4 shows a bearing cage apparatus with oil migration surface grooves, in accordance with another example embodiment.

Referring to FIG. 4, bearing cage apparatus 400 has oil migration surface grooves, in accordance with another example embodiment. The bearing cage apparatus 400 includes multiple pockets with reservoirs between the pockets, with the oil migration surface grooves between each pocket and reservoir along sidewalls of the bearing cage apparatus. Pocket 402, reservoir 404 and groove 406 are labeled by way of example. Two grooves are shown between each reservoir and pocket. However, one, three or more grooves may be implemented in a similar manner. Further, while the grooves as shown extend along a relatively lateral direction, various embodiments employ grooves at inclines relative to upper and lower surfaces of the bearing cage apparatus 400, such as by extending downward from a reservoir toward a pocket. Further, various groove shapes may be employed, such as shown in FIGS. 6-8.

Figure 5:
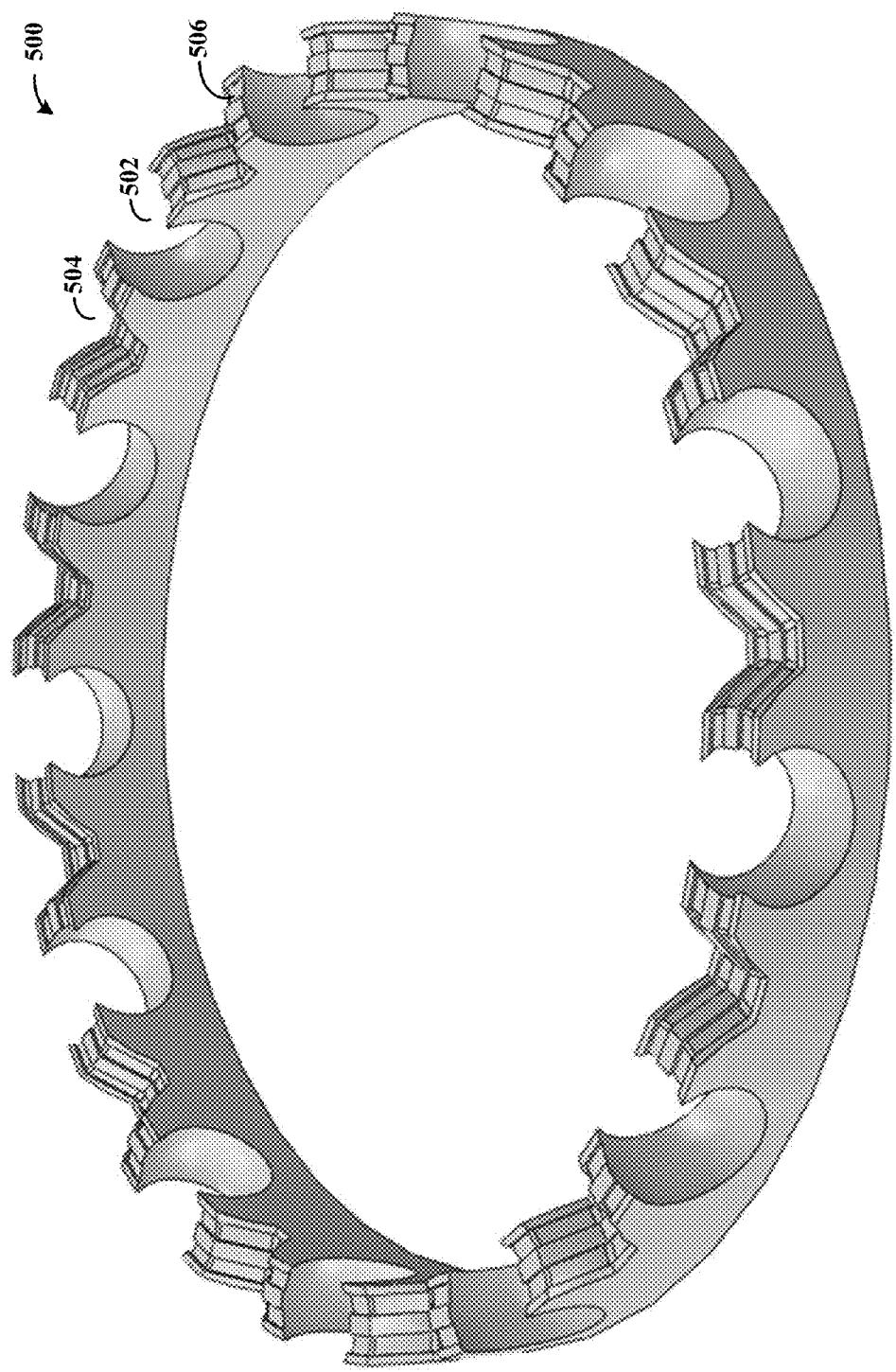
FIG. 5 shows a bearing cage apparatus with trough-type migration channels, in accordance with another example embodiment.

FIG. 5 shows a bearing cage apparatus 500 with shallow slot-type migration channels, in accordance with another example embodiment. The bearing cage apparatus 500 includes multiple pockets with reservoirs between the pockets, with two of the shallow slot-type migration channels between each pocket and reservoir. Pocket 502, reservoir 504 and slot-type channel 506 are labeled by way of example. While two of the slot-type channels are shown between each reservoir and pocket, one, three or more such channels are implemented in a similar manner, for various embodiments. In addition, various slot shapes may be employed, such as shown in FIGS. 6-8.

As noted above, FIGS. 6-8 show various shapes as may be employed separately, or in combination with each other or others shapes herein, for channels, slots, tunnels and other aspects of oil migration components in accordance with one or more embodiments. FIG. 6 shows a square-shaped feature 600, FIG. 7 shows a wedge-shaped feature 700, and FIG. 8 shows a curve-shaped feature 800, as may be implemented with various embodiments, such as with the shown bearing cage slot. The features in FIGS. 6-8 may also be implemented with the migration channels, tunnels and grooves as shown in FIGS. 1B, 2, 3, 4 and 5.

Figure 9:
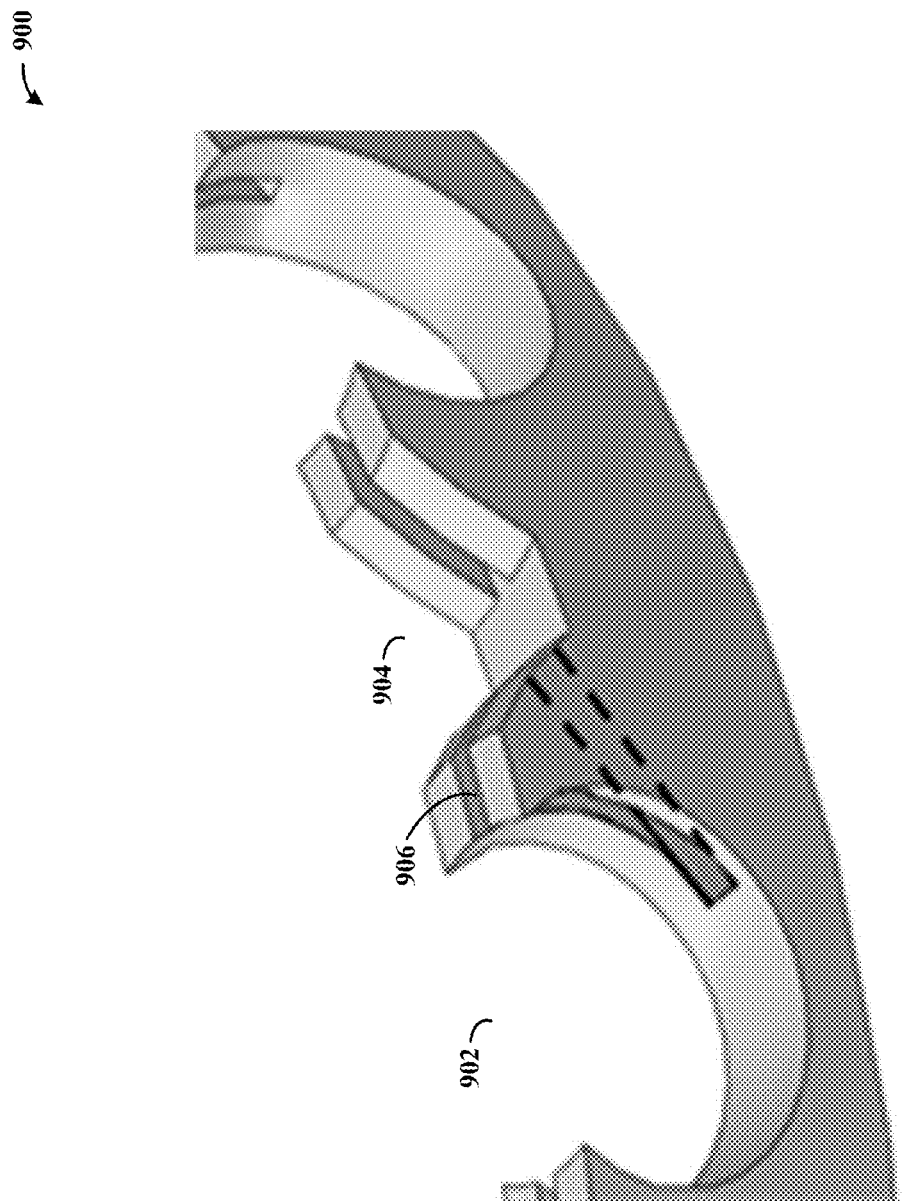
FIG. 9 shows another bearing cage apparatus with a migration channel having a sloped channel, in accordance with one or more embodiments.

FIG. 9 shows another bearing cage apparatus 900, with a sloped migration channel as may be implemented in accordance with one or more embodiments. The bearing cage apparatus 900 includes multiple pockets with reservoirs between the pockets, including pocket 902, reservoir 904 and channel 906 labeled by way of example. Two or more such channels may be implemented between each pocket and reservoir. The channel 906 slopes down from the reservoir 904 into pocket 902, as shown by dashed lines showing a lower surface of the slot. In addition, various slot shapes may be employed, such as shown in FIGS. 6-8, along the bottom of the (sloped) channel 906. A similar approach may be employed with other types of migration structures, including tunnels, grooves and other slots.

The various embodiments described herein may be combined in certain embodiments, and various aspects of individual embodiments may be implemented as separate embodiments. For instance, the various cages shown in FIGS. 1B, 3, 4, 5 and 9 may be implemented with the assembly shown in FIGS. 1A and 1C. In addition, roller-type bearings may be provided with different types of bearing pockets and with similar migration channels.

Based upon the above discussion and illustrations, those skilled in the art will readily recognize that various modifications and changes may be made to the various embodiments without strictly following the exemplary embodiments and applications illustrated and described herein. For example, a variety of types of bearings may be employed, such as roller bearings or ball bearings, and a variety of types of lubricant reservoirs and migration channels. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
    a bearing cage having a length;
    a plurality of ball pockets at respective locations along the length of the bearing cage, each ball pocket being configured and arranged to hold a ball;
    a plurality of lubricant reservoirs between adjacent ones of the ball pockets along the length of the bearing cage; and
    a plurality of lubricant migration channels recessed in the bearing cage, each lubricant migration channel extending between and connecting one of the lubricant reservoirs and one of the ball pockets and being configured and arranged to flow lubricant between the one of the lubricant reservoirs and the one of the ball pockets.

2. The apparatus of claim 1, wherein
    the bearing cage has respective sidewalls extending along the length and defining a thickness of the bearing cage;
    each ball pocket is defined by a portion of the bearing cage extending along the thickness;
    each lubricant reservoir has an opening defined by a portion of the bearing cage between adjacent ones of the ball pockets and is configured and arranged to contain lubricant in the opening; and
    each lubricant migration channel has sidewalls confined within the thickness of the bearing cage between the sidewalls thereof.

3. The apparatus of claim 2, wherein the sidewalls of the bearing cage are concentric and face one another in a direction along the thickness of the bearing cage.

4. The apparatus of claim 1, wherein
    the bearing cage has sidewalls that define a thickness of the bearing cage and that have a height that extends from an upper surface to a lower surface, and
    each of the lubricant migration channels includes a slot having sidewalls that extend from the upper surface toward the lower surface along the direction of the height, and that extend between one of the lubricant reservoirs and one of the ball pockets.

5. The apparatus of claim 4, wherein the lubricant reservoirs extend from an opening at the upper surface to a bottom reservoir surface recessed below the upper surface and above the lower surface, and each slot extends from the upper surface to a bottom slot surface having a depth that is at least as deep as a depth at which the bottom reservoir surface is recessed.

6. The apparatus of claim 4, wherein the lubricant reservoirs extend from an opening at the upper surface to a bottom reservoir surface recessed below the upper surface and above the lower surface, and each slot extends from the upper surface to a bottom slot surface having a depth that is less than a depth at which the bottom reservoir surface is recessed.

7. The apparatus of claim 1, wherein
the bearing cage has sidewalls that define a thickness of the bearing cage and that have a height that extends from an upper surface to a lower surface, and
each of the lubricant migration channels includes an opening extending through and enclosed by a portion of the bearing cage, each opening being recessed between the upper surface and the lower surface and extending between one of the lubricant reservoirs and one of the ball pockets.

8. The apparatus of claim 1, wherein
the bearing cage has respective sidewalls that face each other and extend along the length of the bearing cage; and
each of the lubricant migration channels includes a groove in a portion of one of the sidewalls of the bearing cage, the groove extending between one of the lubricant reservoirs and one of the ball pockets, the groove being configured and arranged to flow lubricant from the one of the lubricant reservoir to the one of the ball pockets.

9. The apparatus of claim 8, wherein the groove extends along a surface of the bearing cage that defines the one of the lubricant reservoirs.

10. The apparatus of claim 1, wherein the lubricant reservoirs extend from an opening at an upper surface of the bearing cage to a bottom reservoir surface recessed from the upper surface and above a lower surface of the bearing cage.

11. The apparatus of claim 1, further including a plurality of balls, each of the balls being held by one of the ball pockets.

12. The apparatus of claim 11, wherein the bearing cage is circular and has an inner surface and an outer surface that is concentric with the inner surface, further including:
an inner bearing race having a ball groove on an outer surface thereof; and
an outer bearing race that is concentric with the inner bearing race and that has a ball groove on an inner surface thereon and that is configured and arranged with the inner bearing race, the bearing cage and balls to affix the balls and the bearing cage between the inner bearing race and the outer bearing race via the ball grooves.

13. The apparatus of claim 1, wherein
the bearing cage has respective sidewalls extending along the length and defining a thickness of the bearing cage, with a portion of the sidewalls extending between each ball pocket and one of the lubricant reservoirs; and
each lubricant migration channel has surfaces defined by the bearing cage and having a surface area that is at least twice a surface area of the portion of the sidewalls extending between each ball pocket and one of the lubricant reservoirs, the surfaces of each lubricant migration channel being configured and arranged to flow lubricant from the lubricant reservoirs to the ball pockets via capillary action.

14. The apparatus of claim 1, further comprising:
a disc configured and arranged to store data;
a head configured and arranged to read data from the disc and to write data to the disc;
an actuator arm having a first portion connected to the head;

a pivot spindle connected to a second portion of the actuator arm and configured and arranged with the actuator arm to move the head relative to the disc for accessing data stored at different locations on the disc, the pivot spindle having a bearing component including:
the bearing cage;
the plurality of pockets;
in each of the pockets, a ball;
a bearing race having a channel and configured and arranged with the balls and the cage to provide rotation of the pivot spindle via rotation of the bearing cage and movement of the balls in the channel;
the plurality of lubricant reservoirs; and
the plurality of lubricant migration channels.

15. The apparatus of claim 14, wherein
the bearing cage has respective sidewalls extending along the length and defining a thickness of the bearing cage, with a portion of the sidewalls extending between each pocket and one of the lubricant reservoirs;
each pocket is defined by a portion of the bearing cage extending along the thickness;
each lubricant reservoir has an opening defined by a portion of the bearing cage between adjacent ones of the pockets and is configured and arranged to contain lubricant in the opening; and
each lubricant migration channel has sidewalls confined within the thickness of the bearing cage between the sidewalls thereof, and having a surface area that is at least twice a surface area of the portion of the sidewalls extending between each ball pocket and one of the lubricant reservoirs, the surfaces of each lubricant migration channel being configured and arranged to flow lubricant from the lubricant reservoirs to the ball pockets via capillary action.

16. An apparatus comprising:
a plurality of first portions of a bearing cage, each first portion being spaced apart from other ones of the first portions and being configured and arranged to hold a rolling component;
a plurality of second portions of the bearing cage, each second portion being located between adjacent ones of the first portions and configured and arranged to hold lubricant; and
a plurality of third portions of the bearing cage, each third portion extending between and connecting one of the second portions with one of the first portions, and each third portion including lubricant migration channels recessed in the third portion and configured and arranged to flow lubricant between the one of the second portions and a rolling component held by one of the first portions.

17. The apparatus of claim 16, wherein
the bearing cage has respective sidewalls extending along a length of the bearing cage and defining a thickness of the bearing cage;
each first portion is defined by a portion of the bearing cage extending along the thickness;
each second portion has an opening defined by a portion of the bearing cage between adjacent ones of the first portions and is configured and arranged to contain lubricant in the opening; and
each lubricant migration channel has sidewalls confined within the thickness of the bearing cage between the sidewalls of the bearing cage.

18. The apparatus of claim 16, wherein the first portions are configured and arranged to hold a rolling component selected from the group of a ball and a roller.

19. The apparatus of claim 16, wherein
the bearing cage has sidewalls that define a thickness of the bearing cage and that have a height that extends from an upper surface to a lower surface, and
each third portion includes a slot having sidewalls that extend from the upper surface toward the lower surface along the direction of the height, and that extend between one of the first portions and one of the second portions.

20. The apparatus of claim 16, wherein
the bearing cage has respective sidewalls extending along a length of the bearing cage and defining a thickness of the bearing cage, with a portion of the sidewalls extending between each first portion and one of the second portions; and
each third portion has surfaces defined by the bearing cage and having a surface area that is at least twice a surface area of the portion of the sidewalls extending between each first portion and one of the second portions, the surfaces of each third portion being configured and arranged to flow lubricant from the second portions to the first portion via capillary action.

* * * * *